United States Patent
Friske et al.

(10) Patent No.: US 7,197,920 B2
(45) Date of Patent: Apr. 3, 2007

(54) TEST APPARATUS FOR ACCELERATED WHEEL AND SUSPENSION COMPONENT STRUCTURAL DURABILITY

(75) Inventors: Dave Friske, Royal Oak, MI (US); Laurence Brown, Shelby Township, MI (US); John Gagern, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 10/907,534

(22) Filed: Apr. 5, 2005

(65) Prior Publication Data

US 2006/0218999 A1    Oct. 5, 2006

(51) Int. Cl.
G01M 17/02    (2006.01)
(52) U.S. Cl. .................................................. 73/146
(58) Field of Classification Search .................. 73/146
See application file for complete search history.

(56) References Cited

U.S. PATENT DOCUMENTS

| | | | |
|---|---|---|---|
| 3,986,392 A | 10/1976 | Stiller et al. | |
| 4,233,838 A * | 11/1980 | Stiebel | 73/146 |
| 4,499,759 A | 2/1985 | Hull | |
| 4,852,398 A * | 8/1989 | Cargould et al. | 73/146 |
| 5,029,467 A * | 7/1991 | Cargould | 73/146 |
| 5,111,687 A | 5/1992 | Hill | |
| 5,777,219 A * | 7/1998 | Popio et al. | 73/146 |
| 5,817,935 A | 10/1998 | Di Bernardo et al. | |
| 5,911,164 A * | 6/1999 | McRae | 73/815 |
| 5,979,231 A * | 11/1999 | Lees et al. | 73/146 |
| 5,992,227 A * | 11/1999 | Jellison et al. | 73/146 |
| 6,016,695 A * | 1/2000 | Reynolds et al. | 73/146 |
| 6,192,745 B1 | 2/2001 | Tang et al. | |
| 6,772,626 B1 | 8/2004 | Engel et al. | |
| 2001/0042401 A1 | 11/2001 | Norres et al. | |

FOREIGN PATENT DOCUMENTS

DE    299 23 728 U1    7/2001
WO    WO 2004/055489 A1    7/2004

* cited by examiner

*Primary Examiner*—Andre Allen
(74) *Attorney, Agent, or Firm*—Frederick Owens; Brooks Kushman P.C.

(57) ABSTRACT

A test apparatus for testing a wheel for a vehicle, including a wheel test spindle and a road simulation drum that is rotated by a motor is disclosed. The wheel test spindle may be supported on suspension components. The road simulation drum includes a chuck hole recess that may be provided in a replaceable module comprising a portion of the outer surface of the drum. The motor rotates the drum causing the tire and wheel to rotate on the test spindle to roll against the outer surface of the drum and through the chuck hole recess.

16 Claims, 3 Drawing Sheets

TEST APPARATUS FOR ACCELERATED WHEEL AND SUSPENSION COMPONENT STRUCTURAL DURABILITY

BACKGROUND OF THE INVENTION

1. Field of the Invention

The present invention relates to a test stand for accelerated testing of vehicle suspension components generally and focuses more particularly on testing the structural durability of vehicle wheels.

2. Background Art

Vehicles are extensively tested to verify compliance with durability standards and provide quality assurance. One vehicle durability test is known as a road durability test in which complete vehicle prototypes are driven on a variety of roads that provide different challenges to vehicle durability. Typical road durability tests may require 80 days of substantially continuous driving. This type of test is an excellent durability test and can provide valuable data to vehicle designers. One problem with this type of test is that it cannot begin until a prototype is fully constructed. Test results may not be available for an extended prior of time, potentially as long as or longer than 80 days, while the test is run.

Testing wheels in a road durability test is expensive and time consuming. Many vehicle families may offer 8 to 10 different wheel designs to provide model differentiation. Wheel and tire option packages are popular with consumers and add to the profit potential for new vehicle sales. Currently, original equipment manufacturers test vehicle wheels for quality assurance. One problem associated with testing 10 different wheels in long term road tests is that a large number of prototype vehicles are required for testing. Another problem is the substantial delay in obtaining approval of new wheels. Prototype vehicles are generally destroyed after road durability testing in the course of being deconstructed and analyzed. There is a substantial cost incurred when expensive prototype vehicles must be scrapped.

It is has been determined that the most damaging event for wheel road durability testing is a chuck hole impact. It is difficult to simulate accurately chuck hole testing in an accelerated test. Accelerated chuck hole testing requires simulation of a dynamic impact event which is a complex multi-variable simulation. While chuck holes in roads vary in size and shape, testing standards have been developed for simulating chuck hole impacts at various speeds. For example, chuck hole testing for driving at 30 miles per hour has led to the development of a standard chuck hole wherein a 4" depth chuck hole is provided that is 30" long. When a vehicle traveling at 30 miles per hour rides over the test chuck hole, the tire and wheel generally drop approximately 2" by the time the edge of the chuck hole is contacted by the tire. The tire does not generally bottom out in the chuck hole.

All parts of a vehicle suspension assembly can impact the performance of a wheel in a chuck hole impact event. In addition to testing wheels, chuck hole testing may be used to dynamically test shocks, springs and other suspension components. To improve vehicle suspension design, there is a need for an accelerated testing procedure that will facilitate suspension tuning prior to the availability of completed vehicle prototypes.

Accelerated testing may be conducted on vehicle test tracks that may be provided with chuck hole test areas. Reliable accelerated testing may be provided by placing a series of test chuck holes in a test track environment and passing a vehicle repeatedly over the series of chuck holes. Accelerated testing on a test track is less time-consuming and may be less expensive than road durability testing, but requires relatively expensive test track driving time. Testing for wheel durability on such a test track may require up to 10 days to develop reliable durability test results. This approach to accelerated testing is a destructive vehicle test and requires expensive prototype vehicles.

Radial test machines have been developed for wheel and tire testing. Radial test machines allow accelerated testing of wheels and tires at relatively high speeds. A tire and wheel may be instrumented with strain gauges and other sensors and run on a rotating drum that is driven by a relatively low torque motor in a radial test machine. Simulating a chuck hole impact on a radial test machine is difficult due to the severity of a chuck hole impact. Chuck hole impact simulation for durability testing may necessitate a 5,000 to 6,000 pound radial load impact that may occur with a frequency of two impacts per second on a radial test machine. Normal radial test machines under such test conditions would be expected to self destruct.

One example of a test machine used to simulate an impact event is disclosed in U.S. Pat. No. 5,817,935. This patent discloses a test apparatus in which a wheel is rotated against a cylindrical drum or wheel that is provided with an obstacle having a relatively low profile. The wheel is supported on a hub that is rotated by a steering knuckle so that the tire remains in contact with the road wheel. If an obstacle equivalent to a 4" deep chuck hole were provided on the test apparatus disclosed in this patent, the test apparatus is expected to be damaged or destroyed. Another shortcoming of this device is that it is not capable of being used to test other suspension components.

Another approach to simulating impact resistance of a tire is disclosed in U.S. Pat. No. 3,986,392 wherein a plunger is periodically extended through a peripheral opening in a test wheel to cause an impact event on the tire. The tire is relatively rigidly supported on a frame as it engages the test wheel. The test device would not be expected to be able to withstand repeated impacts of the severity that could provide reliable wheel durability testing. This apparatus is also not capable of testing other suspension components dynamically.

There is a need for an accelerated wheel test that also may be used to test other suspension components. Such an accelerated test must provide reliable durability data to verify that a wheel suspension component is capable of withstanding rapidly repeated 5,000 to 6,000 pound radial loads representing simulated chuck hole impact events without damage to the test equipment. There is also a need for a reliable chuck hole impact event durability test apparatus that does not self-destruct.

The above problems with prior art durability testing and accelerated durability testing are addressed by applicant's invention as summarized below.

SUMMARY OF THE INVENTION

According to one aspect of the present invention, a test apparatus is provided for testing a wheel for a vehicle. The test apparatus comprises a wheel test spindle that supports the wheel and a tire mounted on the wheel for rotation. A road simulation drum having an outer surface that is engaged by the tire is provided with a chuck hole recess formed in the outer surface. The motor rotates the drum and causes the tire and wheel to rotate on the test spindle and roll against the outer surface of the drum and through the chuck hole recess to simulate the tire and wheel rolling over a chuck hole in a road.

According to other aspects of the invention, the test wheel spindle may be supported relative to the drum on suspension components that are assembled to a stationary support. The suspension components may further comprise a test shock absorber and a test spring that correspond to a vehicle shock absorber and a vehicle spring with which the wheel to be tested is intended to be operated. The test shock absorber and test spring may be disposed on the opposite radial side of the wheel test spindle from the road wheel.

The suspension components may further comprise a shock absorber, a spring, an upper control arm, a lower control arm, a stabilizer bar and a tie rod that corresponds to similar vehicle suspension components. The suspension components may be mounted on the stationary support at a 90° angle relative to the normal orientation of the components on a vehicle. A coolant supply system may be required to provide a flow of coolant medium to the shock absorber.

According to other aspects of an alternative embodiment of the invention, an upper control arm, a lower control arm, a stabilizer bar and a tie rod may be mounted on the stationary support at a 90° angle relative to the normal orientation of the components on a vehicle, while the shock absorber and spring may be mounted on the stationary support in the normal vertical orientation of the components on a vehicle. A bell crank connector may be provided to translate horizontal loads into vertical loads that are applied to the vertically oriented shock absorber and spring.

According to other aspects of the invention, the drum may have a modular tray that includes the chuck hole recess and is selectively removable from the drum. If the modular tray is removed from the drum, it may be replaced by a modular section having a differently configured chuck hole recess or a smooth surface at the same radius as the outer surface of the drum to allow the test apparatus to be used in non-chuck hole testing.

According to another aspect of the invention, the chuck hole recess may be dimensioned to replicate a flat surface chuck hole on the outer surface of the drum that is cylindrical in shape. For example, the chuck hole recess may have a depth of 4" and an arcuate length of 30" for test simulating a standardized chuck hole test wherein a vehicle is driven at 30 miles per hour by rotating the outer surface of the drum at that speed. Alternatively, the recess may have a depth of 4" and a arcuate length of 15" to simulate a chuck hole event with a vehicle traveling at 15 miles per hour.

According to another aspect of the invention, first and second wheel test spindles may be provided at diametrically opposed locations relative to the road simulation drum. The road simulation drum may be used to simultaneously test two tire and wheel assemblies, plus their associated suspension components.

The above and other aspects of the invention will be readily apparent to one of ordinary skill in the art in view of the attached drawings and following detailed description of the illustrated embodiment.

DETAILED DESCRIPTION OF THE ILLUSTRATED EMBODIMENTS

Figure 1:
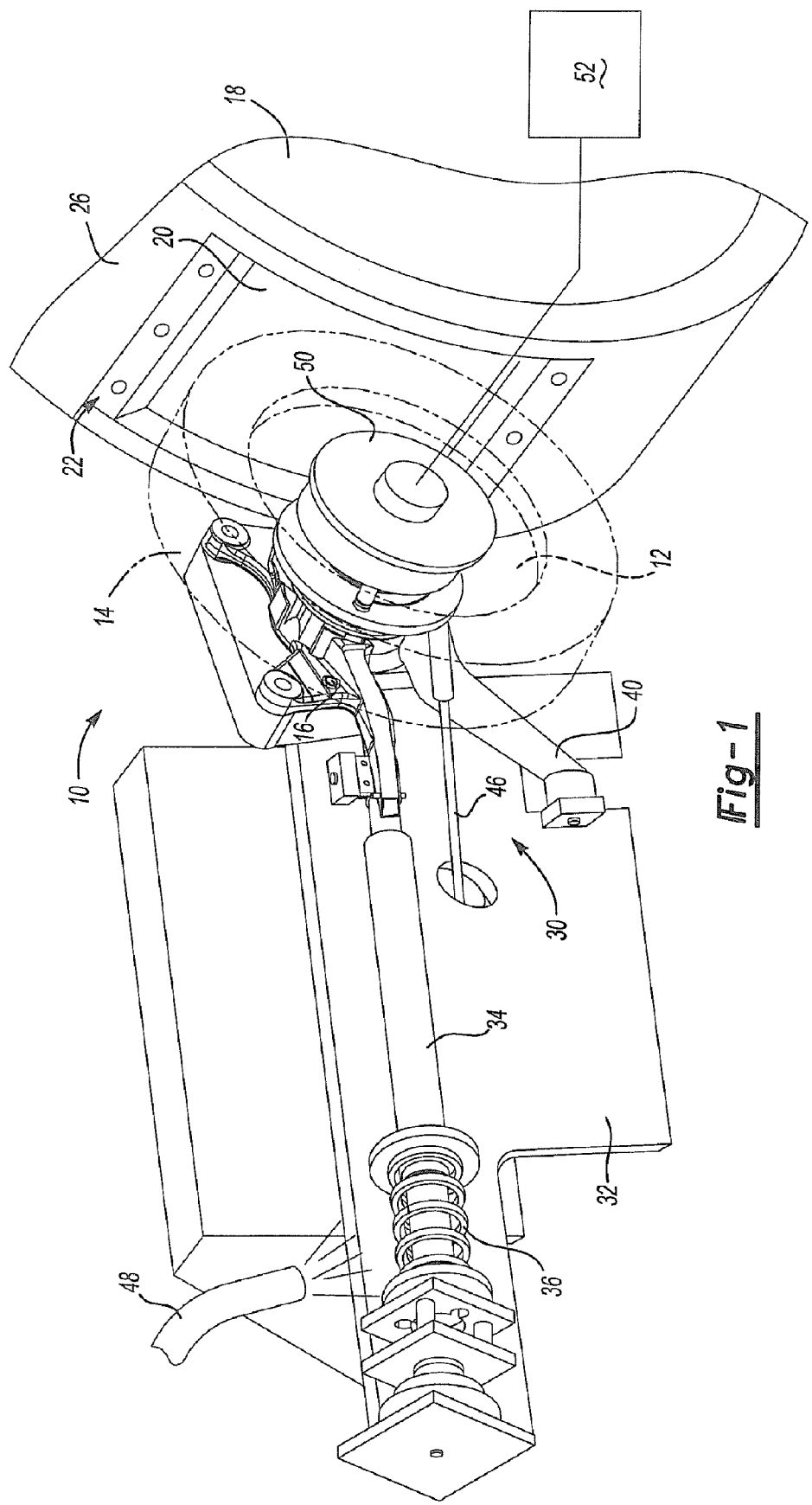
FIG. 1 is a fragmentary perspective view of a test apparatus made in accordance with one embodiment of the present invention.

Referring to FIG. 1, a test apparatus is generally identified by reference numeral 10. The test apparatus 10 is used to test a wheel 12 and a tire 14 that are mounted on a wheel spindle 16. A road simulation drum 18 is provided with a chuck hole recess 20 that is part of a module 22 that is received in the road simulation drum 18. The chuck hole recess module 22 forms part of the outer surface 26 of the road simulation drum 18. The road simulation drum 18 is rotated by an electric motor (not shown). The tire 14 rides on the outer surface 26 of the drum 18 and rotates at a selected speed with the drum 18. The speed of rotation of the electric motor may be adjusted to simulate impacts of the tire 14 and wheel 12 on the chuck hole recess 20 at different speeds.

Figure 2:
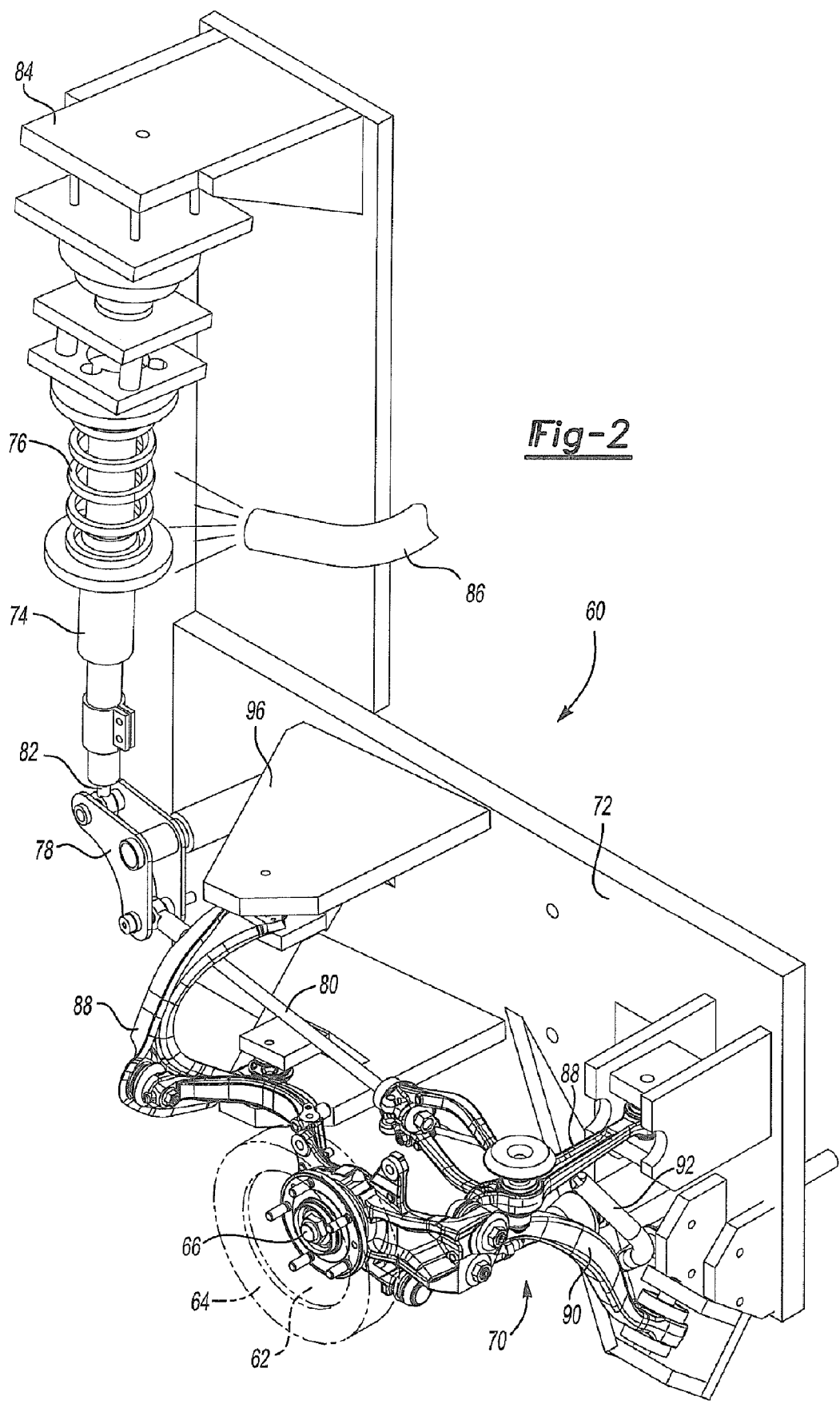
FIG. 2 is a fragmentary perspective view of a wheel assembly, suspension system and support fixture according to an alternative embodiment of the invention that is adapted to be used with a wheel machine having a chuck hole module as shown in FIG. 1.

A suspension system is generally indicated by reference numeral 30. The suspension system 30 is supported on a suspension system support fixture 32 that includes mounts positioned to support suspension system components in an orientation that is intended to simulate the relative position of the suspension system 30 components of a simulated vehicle suspension system. Referring to FIGS. 1 and 2, the suspension system 30 may include a shock absorber 34, spring 36, upper control arm (not shown), lower control arm 40 and stabilizer bar (not shown). Other suspension system components may also be mounted on support fixture 32. Other suspension system components, such as a king pin, tie rod, and the like, may also be tested.

The shock absorber in FIG. 1 is mounted in a generally horizontal orientation which is rotated 90° relative to a normal shock mount arrangement. A standard shock absorber includes a fluid damping system that is designed to function with the shock absorber in a vertical orientation. For test purposes, a mono tube-type shock absorber generally used in racing vehicles may be adapted to be used in a horizontal orientation.

A cooling system 48 is expected to be provided due to the severity and frequency of impacts applied in the course of the test. The cooling system cools the shock absorber 34 as it absorbs the 5,000–6000 pound radial impact loads at a frequency of several impacts per second depending upon the speed of rotation of the road simulation drum 18. The cooling system 48 may be a water spray type cooling system that directs a spray of cooling water or coolant onto the shock absorber 34. Alternatively, the shock absorber 34 could be cooled by circulating the hydraulic damping fluid of the shock absorber 34 through a fluid circulating system external to the shock absorber. Another approach to cooling the shock absorber would be to place the shock absorber in a cooling bath or water jacket that could be provided with a circulating coolant medium.

A contact ring 50 is illustrated in FIG. 1 that may provide rotating electrical contacts that can communicate data from strain gages and other sensors mounted on the wheel to a test analyzer 52.

In the course of the test, the wheel 12 and tire 14 are rotated against the outer surface 26 of the drum 18 at a desired speed. The tire 14 impacts the chuck hole recess 20 with each rotation of the drum 18 resulting in an impact that tests the durability of wheel 12 and other suspension system 30 components. The suspension system 30 supports the wheel 12 and tire 14 on the wheel spindle 16 dynamically to simulate how the wheel 12 and tire 14 are intended to be supported on a vehicle.

The road simulation drum 18 is shown with module 22 that defines the chuck hole recess 20. It should be understood that the module 22 could be removed and replaced by a module having a different sized chuck hole recess or by a smooth plate if it is desired to use the test apparatus 10 to simulate operation on a smooth road.

Referring to FIG. 2, an alternative test apparatus 60 is shown wherein a wheel 62 is provided with a tire 64 and mounted on a spindle 66. A suspension system, generally referred to by reference numeral 70, is provided on a suspension system support fixture 72. A shock absorber 74 is vertically mounted with a spring 76 to eliminate the problems associated with horizontally orienting the shock absorber 34 in the embodiment of FIG. 1. In the alternative test apparatus 60, the shock absorber 74 is mounted in a vertical orientation. Impacts to the wheel 62 and tire 64 are translated 900 by means of a bell crank 78. A stinger 80 is connected between spindle 66 and bell crank 78 to transmit shock impacts from the spindle 66 to the shock absorber 74. The bell crank 78 moves arcuately when the stinger 80 is moved by the spindle 66. A shock connector 82 is connected to the bell crank 78. A shock mount fixture 84 supports the upper end of the shock absorber 74. In this orientation, the shock absorber 74 and its hydraulic damping system may operate in a way that more closely simulates shock absorber operation in its normal vehicle orientation.

A coolant sprayer 86 is shown in FIG. 2 that is oriented to direct a spray of coolant onto the shock absorber to cool the shock absorber. Due to the severity and frequency of impacts absorbed by the shock absorber 74 in this accelerated test, some type of cooling mechanism is expected to be required to prevent the shock absorber from over-heating and failing prematurely. The coolant system in the illustrated embodiment is a coolant spray. However, other types of cooling systems could be used, such as a system that recirculates the hydraulic damping fluid through a heat exchanger or by immersing the shock absorber in a fluid contained within a jacket.

The suspension system 70, as illustrated in FIG. 2, includes an upper control arm 88, a lower control arm 90, and a stabilizer bar 92. The control arms 88, 90 and stabilizer bar 92 are oriented to support the spindle 66 in a manner that simulates a vehicle suspension system with which the wheel 62 and tire 64 are intended to be operated.

Figure 3:
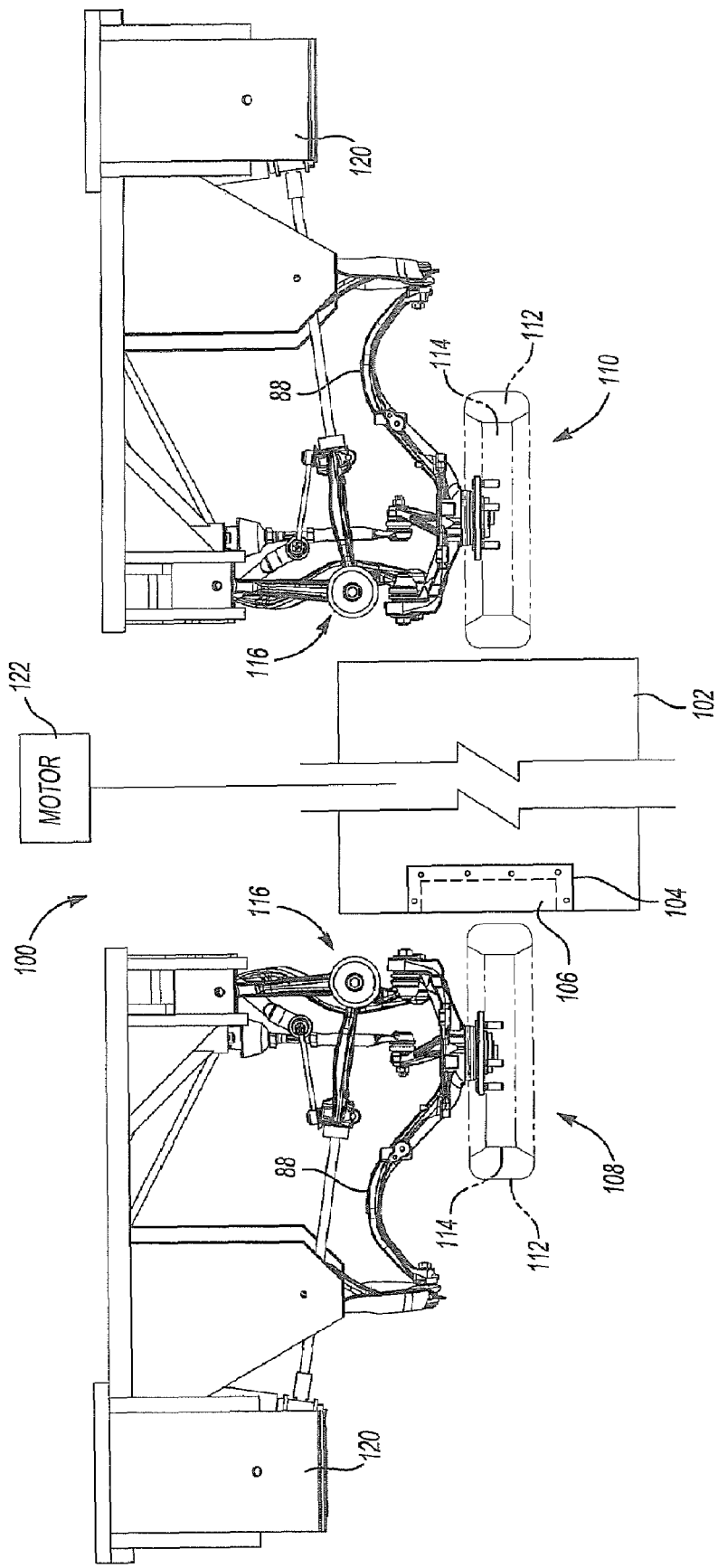
FIG. 3 is a top plan view of a dual test apparatus made according to another embodiment of the present invention wherein two tire and wheel assemblies may be tested simultaneously on a wheel machine having a road simulation drum including a chuck hole module according to another embodiment of the invention.

Referring to FIG. 3, a double test apparatus is generally indicated by reference numeral 100. The double test apparatus 100 has a road simulation drum 102 that is provided with a chuck hole module 104 that defines a chuck hole recess 106. The test apparatus includes a first wheel spindle 108 and a second wheel spindle 110 on opposite sides of the drum 102. The component parts of the first and second wheel spindles 108 and 110 may be generally identical and the same reference numerals will be used to refer to corresponding parts of each. A tire 112 and wheel 114 are supported on the wheel spindles 108, 110 each with a suspension system 116 that includes the suspension system components as previously identified with reference to FIGS. 1 and 2. The suspension system 116 is intended to replicate the suspension system of a vehicle to be simulated. A shock/spring mounting fixture 120 supports the shock and spring portions of the suspension system 116 in a vertical orientation as described with reference to FIG. 2. The double test apparatus 100 provides the ability to test two wheels and, if desired, two suspension systems at the same time. The motor 122 rotates the drum 102 and the tires 112 and wheels 114 bring them into contact with the chuck hole recess 106 with every rotation of drum 102. The spindles 108, 110 are supported by the suspension system 116 to provide a reliable simulation of repetitive chuck hole impact on two different wheels and suspension systems at the same time.

While the best mode for carrying out the invention has been described in detail, those familiar with the art to which this invention relates will recognize various alternative designs and embodiments for practicing the invention as defined by the following claims.

What is claimed is:

1. A test apparatus for testing a wheel of a vehicle, comprising:
a wheel test spindle that supports the wheel and a tire mounted on the wheel for rotation;
a road simulation drum having a outer surface that is engaged by the tire, the drum having a chuck hole recess formed in the outer surface wherein the recess is recessed relative to the outer surface of the drum and extends circumferentially around a portion of the drum;
a motor rotating the drum and causing the tire and wheel to rotate on the test spindle and roll against the outer surface of the drum and through the chuck hole recess to simulate the tire and wheel rolling over a chuck hole in a road.

2. The test apparatus of claim 1 wherein the wheel test spindle is supported relative to the drum on suspension components that are assembled to a stationary support.

3. The test apparatus of claim 2 wherein the suspension components further comprise a test shock absorber and a test spring that correspond to a vehicle shock absorber and a vehicle spring.

4. The test apparatus of claim 3 wherein the test shock absorber and test spring are disposed on the opposite radial side of the wheel test spindle from the road wheel.

5. The test apparatus of claim 2 wherein the suspension components further comprise a test shock absorber, a test spring, an upper control arm, a lower control arm, and a tie rod that correspond to similar corresponding vehicle suspension components.

6. The test apparatus of claim 5 wherein all of the suspension components are mounted on the stationary support at a 90 degree angle relative to the normal orientation on a vehicle.

7. The test apparatus of claim 6, further comprising a coolant supply system that provides a flow of a coolant medium to the shock absorber.

8. The test apparatus of claim 5 wherein the an upper control arm, a lower control arm, and a tie rod are mounted on the stationary support at a 90 degree angle relative to the normal orientation on a vehicle and the shock absorber and spring are mounted on the stationary support in the normal orientation.

9. The test apparatus of claim 8 further comprising a bell crank connector that translates horizontal loads into vertical loads that are applied to the shock absorber and spring.

10. A test apparatus for testing a wheel of a vehicle, comprising:
a wheel test spindle that supports the wheel and a tire mounted on the wheel for rotation;
a road simulation drum having a outer surface that is engaged by the tire, the drum having a chuck hole recess formed in the outer surface wherein the drum has a modular tray that includes the chuck hole recess and is selectively removable from the drum; and a motor rotating the drum and causing the tire and wheel to rotate on the test spindle and roll against the outer surface of the drum and through the chuck hole recess to simulate the tire and wheel rolling over a chuck hole in a road.

11. The test apparatus of claim 10 wherein the recess is dimensioned to replicate a flat surface chuck hole on the outer surface of the drum that is cylindrical in shape.

12. The test apparatus of claim 11 wherein the recess has a depth of four inches and has an arcuate length of 30 inches.

13. The test apparatus of claim 12 wherein the drum is rotated to move the outer surface at a speed of 30 miles per hour.

14. The test apparatus of claim 11 wherein the recess has a depth of four inches and has an arcuate length of 15 inches.

15. The test apparatus of claim 12 wherein the drum is rotated to move the outer surface at a speed of 15 miles per hour.

16. A test apparatus for testing a wheel of a vehicle, comprising:

a wheel test spindle that supports the wheel and a tire mounted on the wheel for rotation;

a road simulation drum having a outer surface that is engaged by the tire, the drum having a chuck hole recess formed in the outer surface;

a motor rotating the drum and causing the tire and wheel to rotate on the test spindle and roll against the outer surface of the drum and through the chuck hole recess to simulate the tire and wheel rolling over a chuck hole in a road wherein the wheel test spindle is a first wheel test spindle, the test apparatus further comprising a second wheel test spindle disposed at a diametrically opposed location relative to the first wheel test spindle that supports a second wheel and a second tire mounted on the second wheel for rotation, wherein the outer surface of the road simulation drum is engaged by the second tire to rotate on the test spindle and roll against the outer surface of the drum and through the chuck hole recess to simulate the second tire and second wheel rolling over the chuck hole in the road.

* * * * *